Aug. 11, 1953  U. FALCONI  2,648,237
UNIVERSAL REAMING MACHINE
Filed March 21, 1951  13 Sheets-Sheet 9
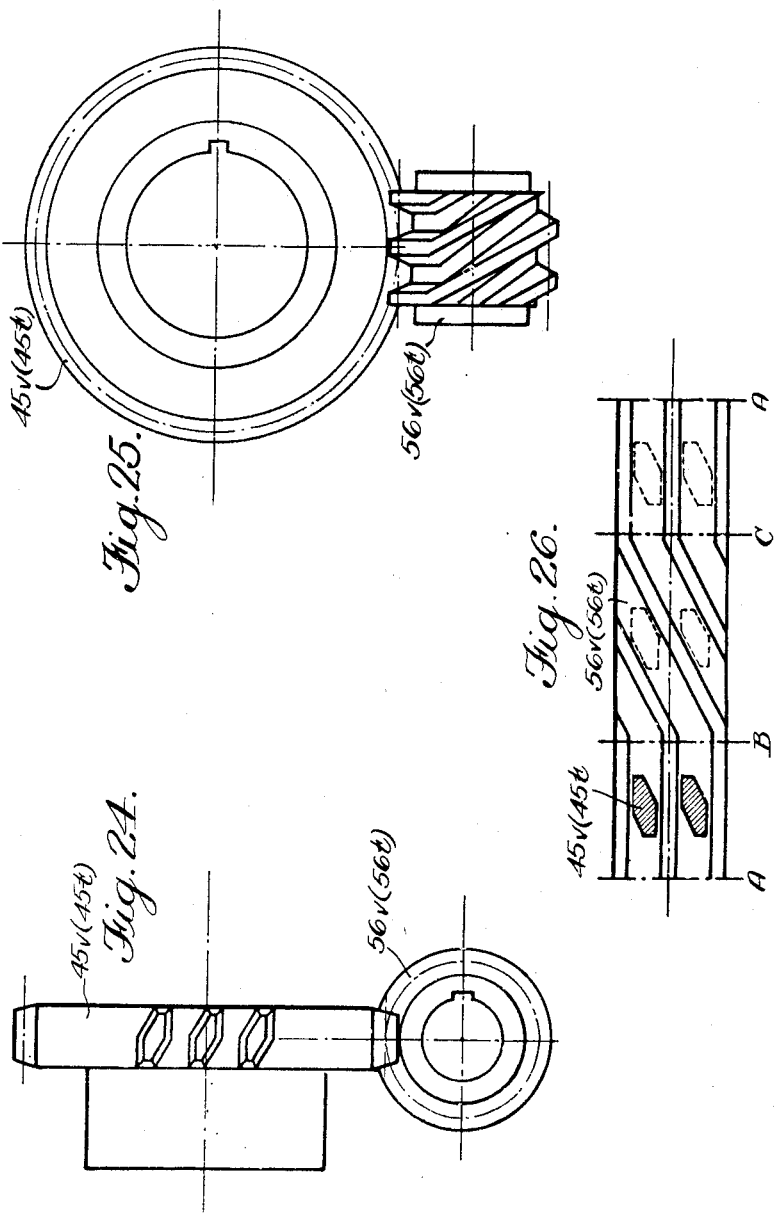

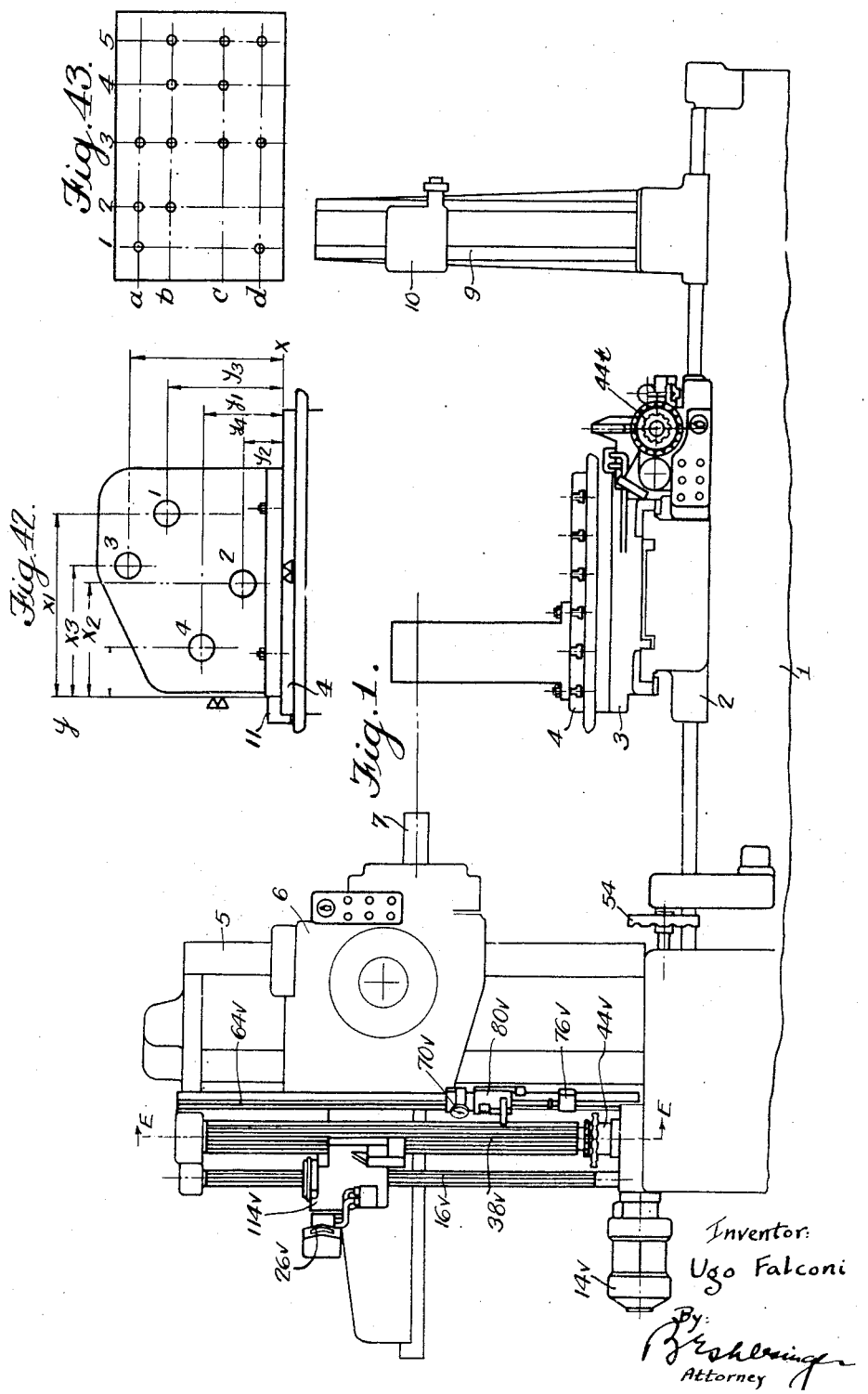

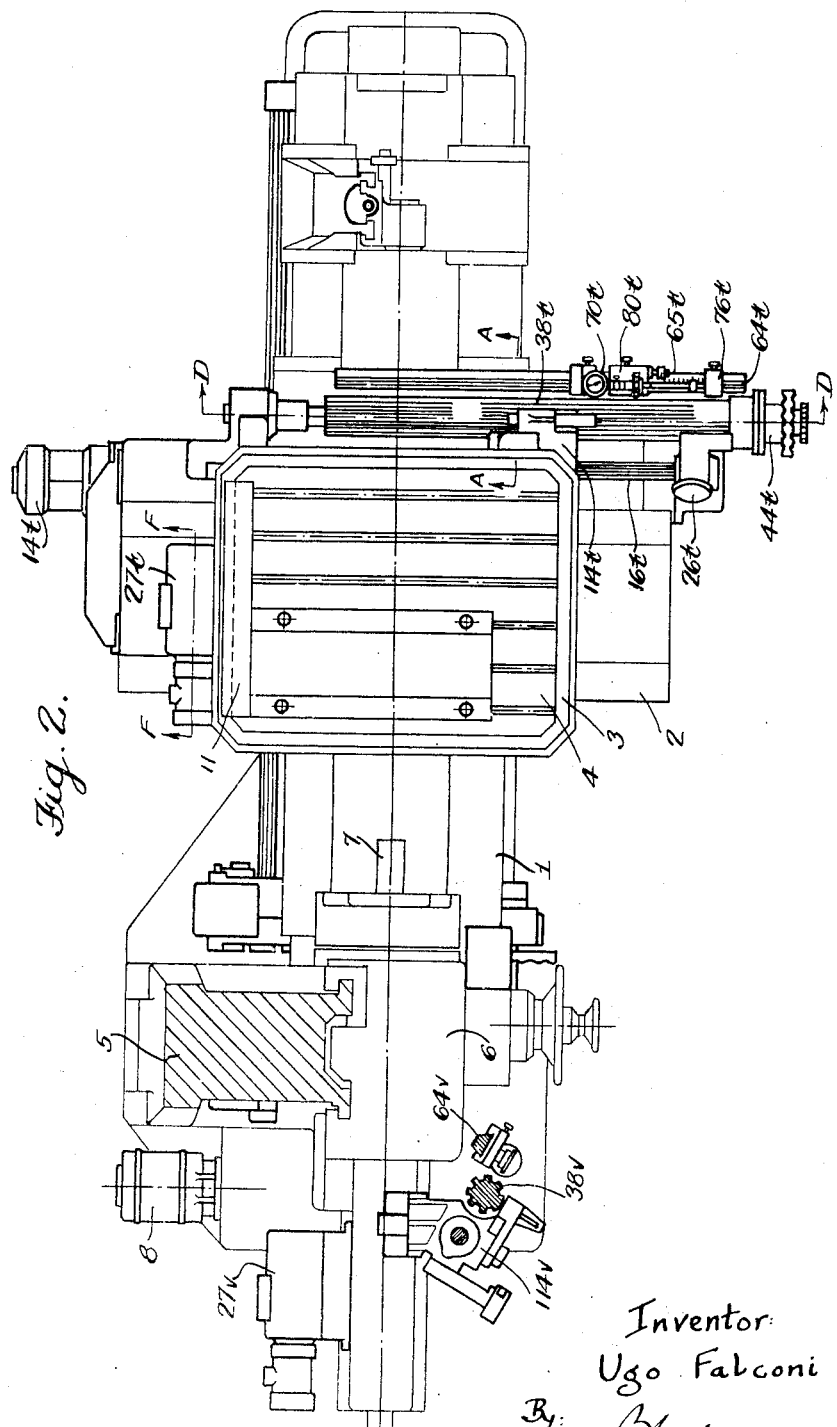

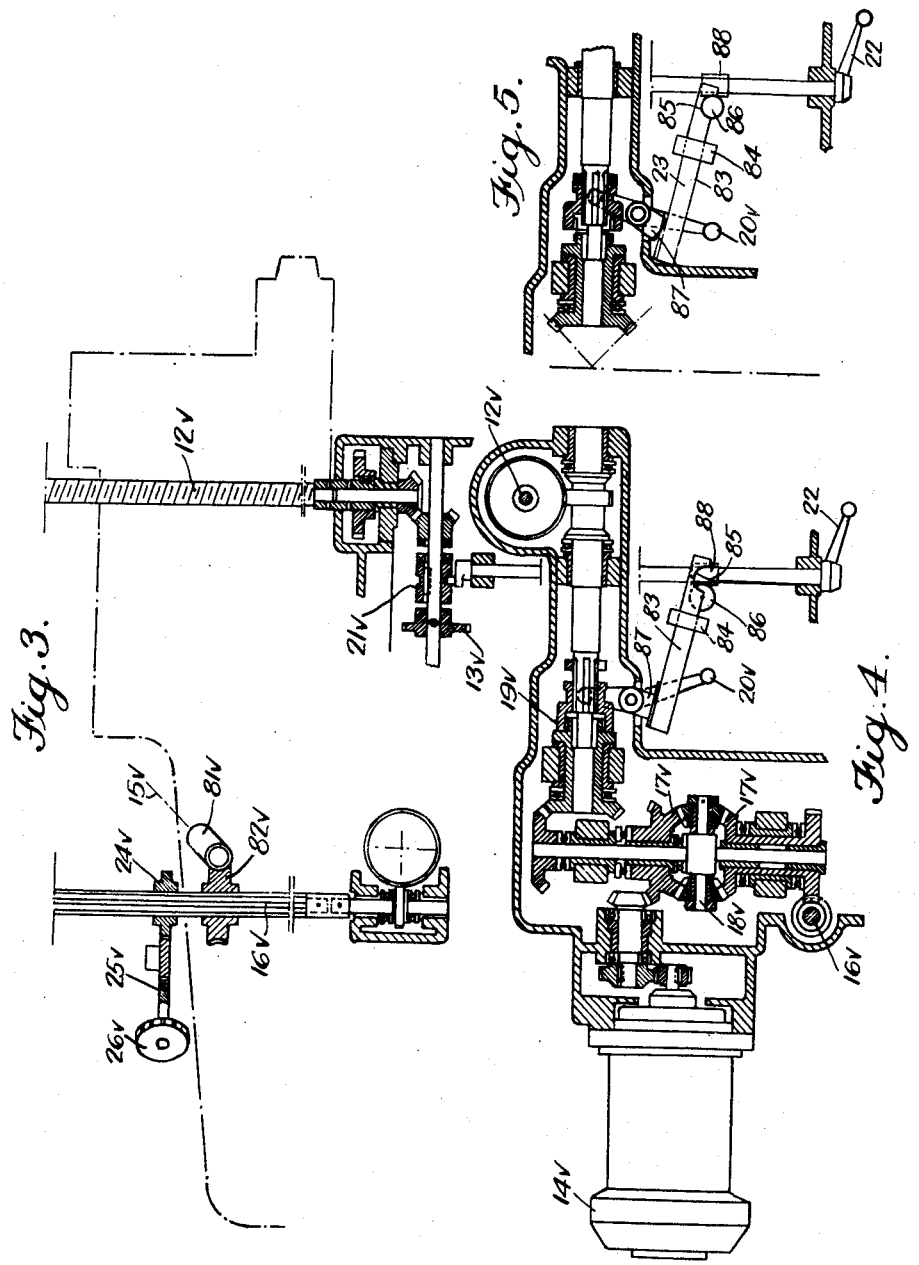

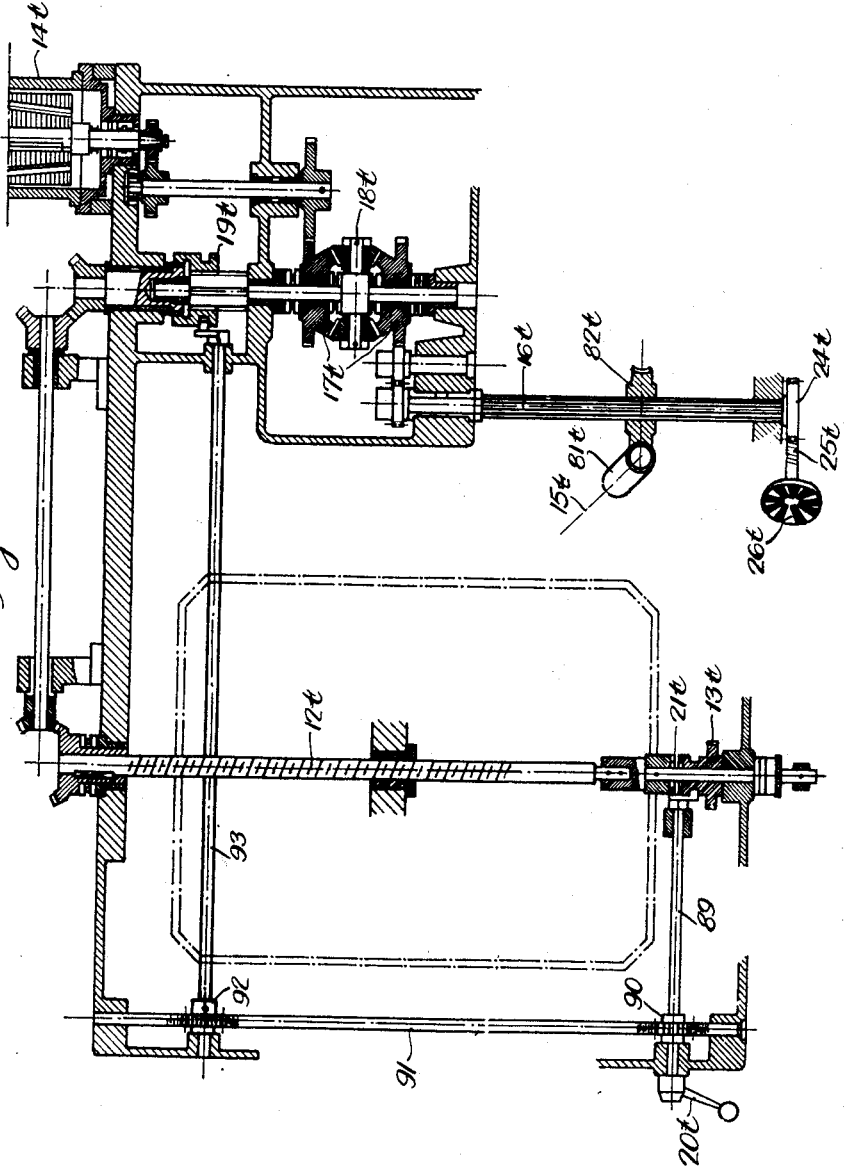

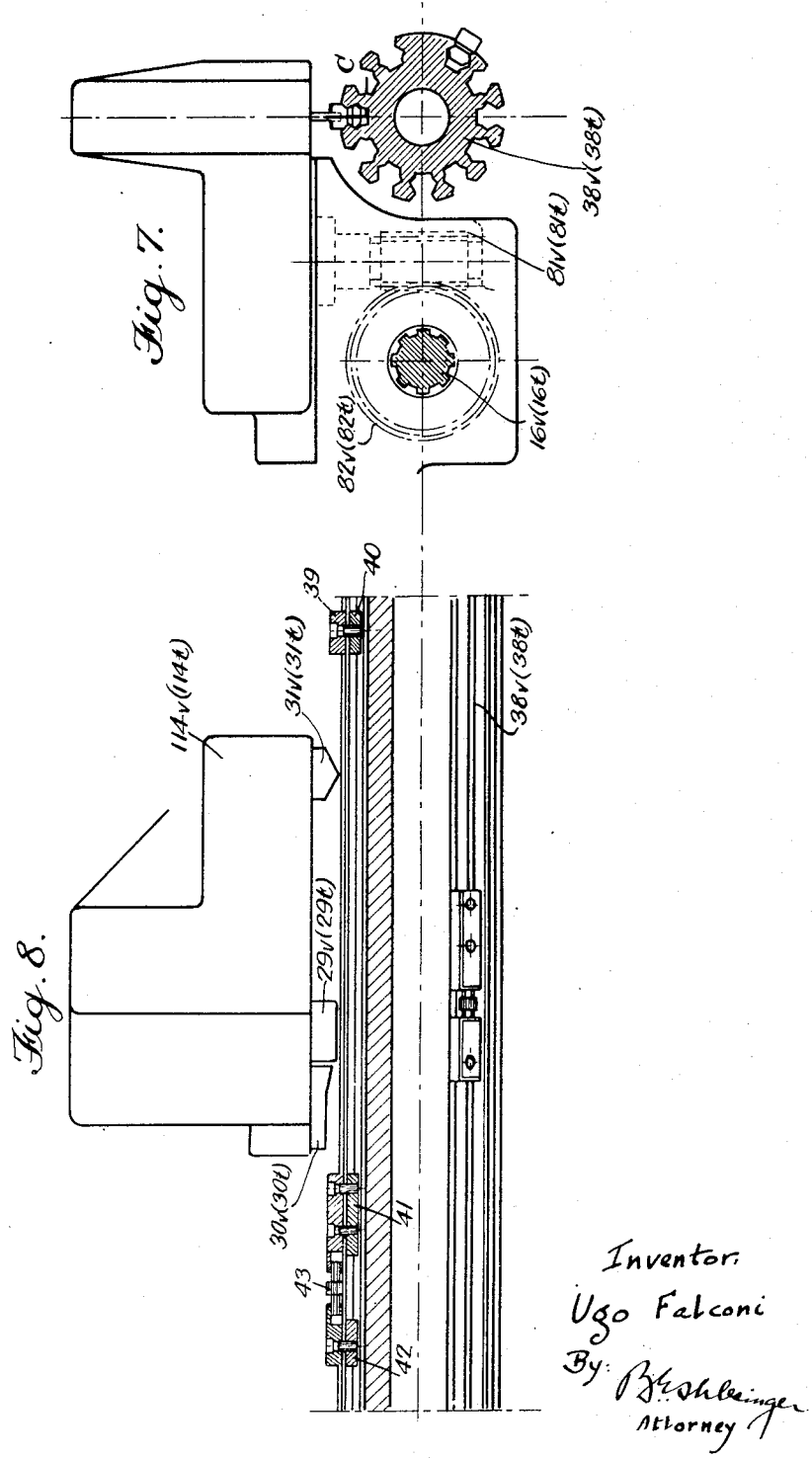

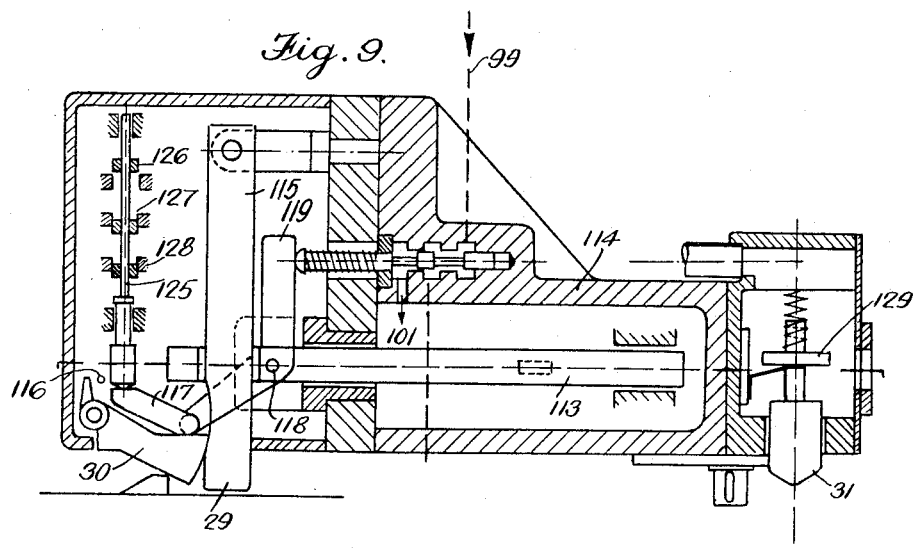
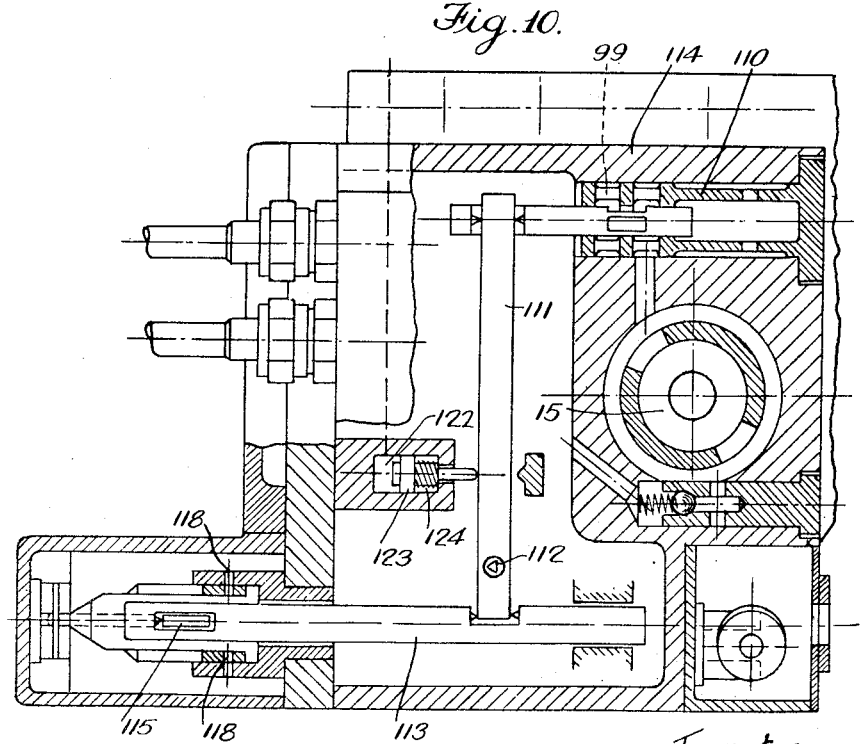

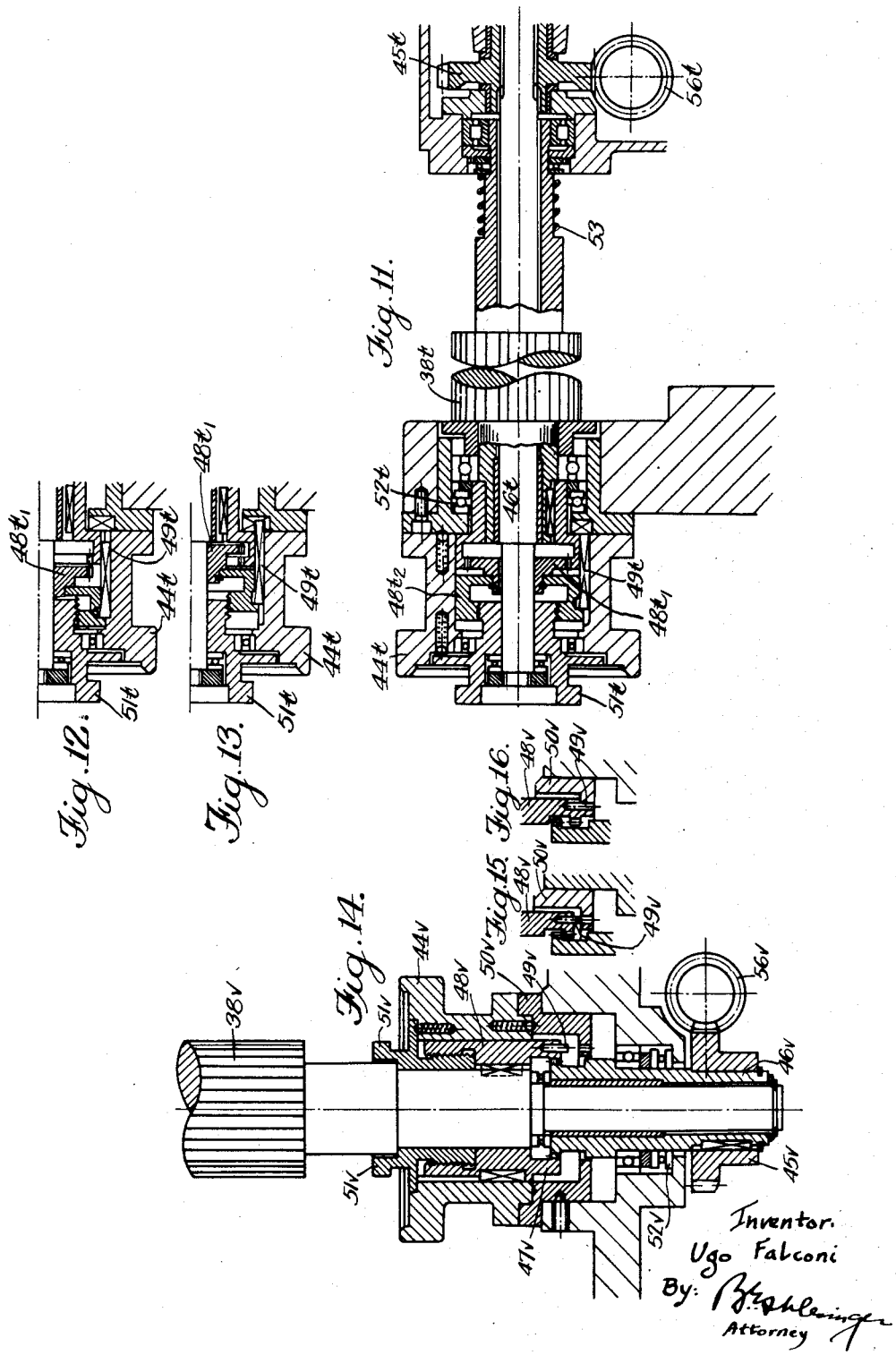

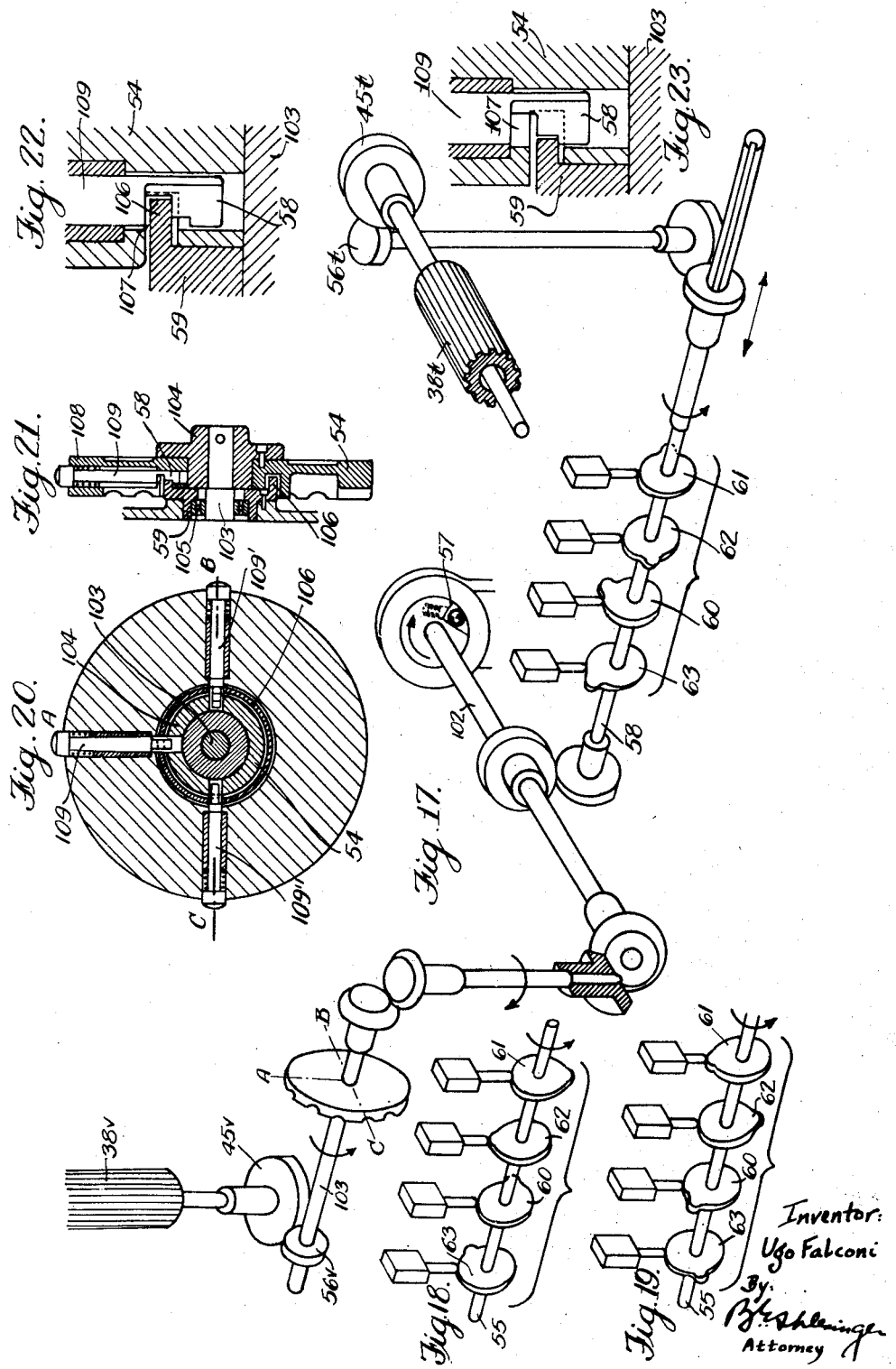

Aug. 11, 1953  U. FALCONI  2,648,237
UNIVERSAL REAMING MACHINE
Filed March 21, 1951  13 Sheets-Sheet 10
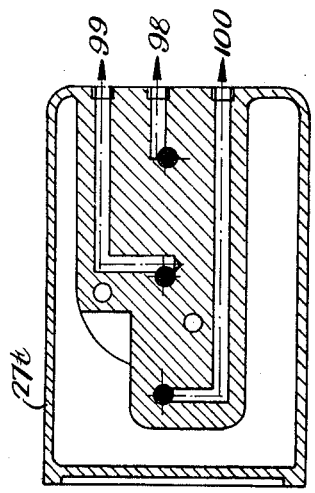
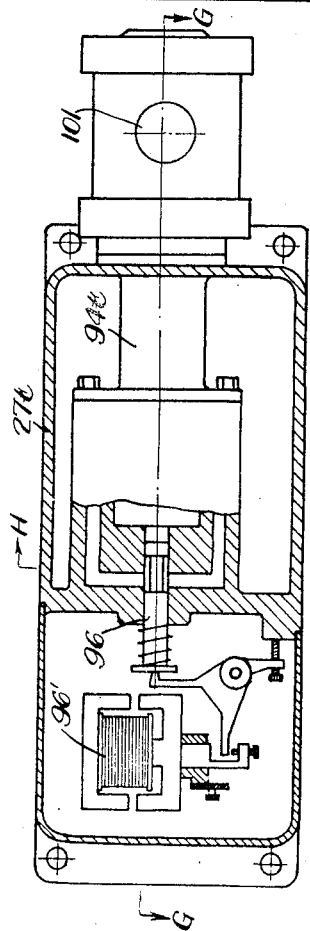
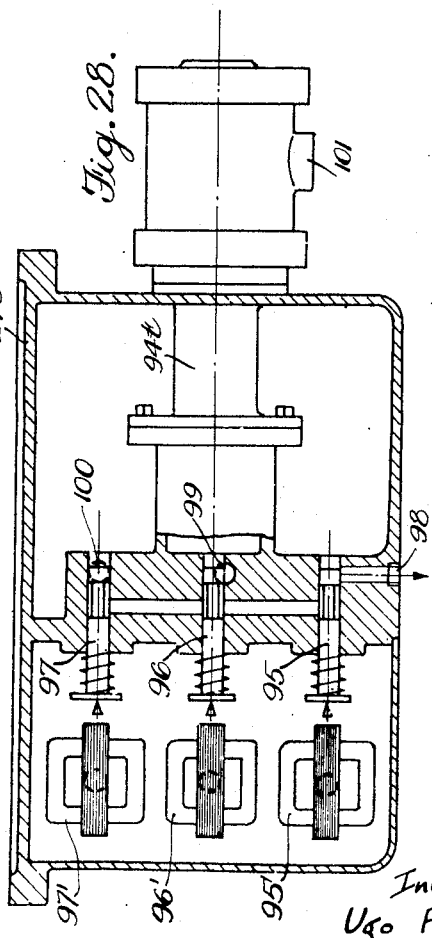
Inventor:
Ugo Falconi
By: [signature]
Attorney

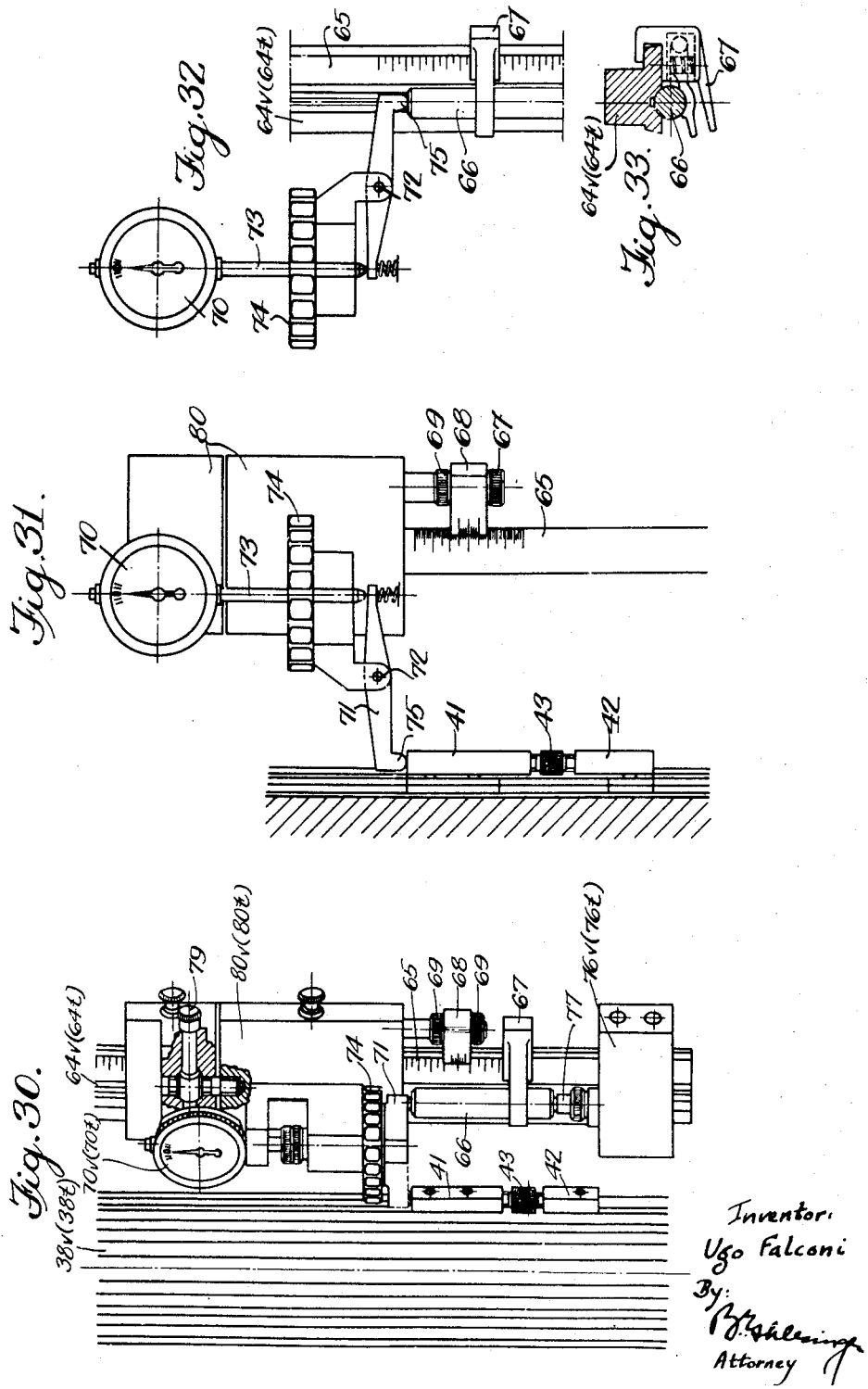

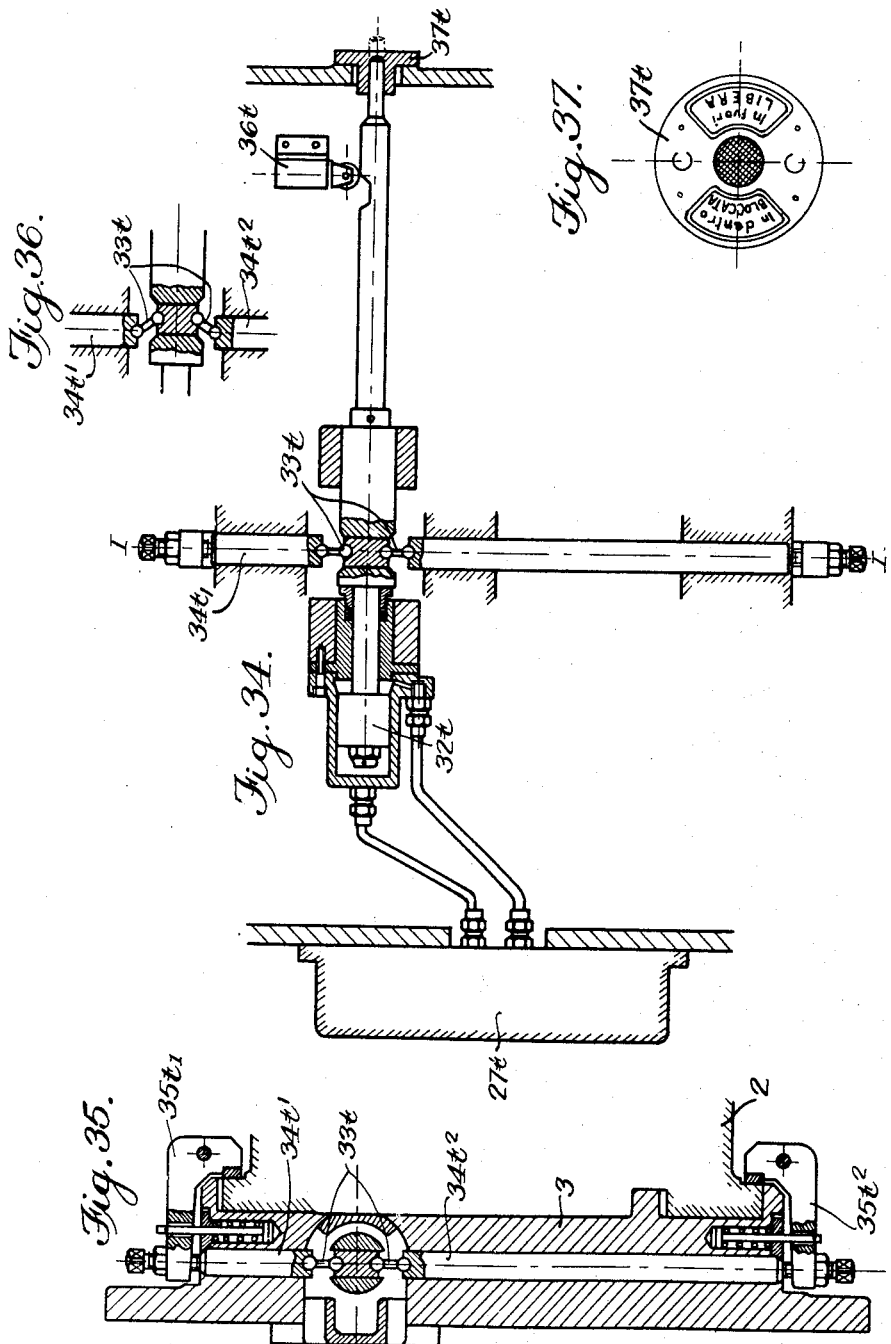

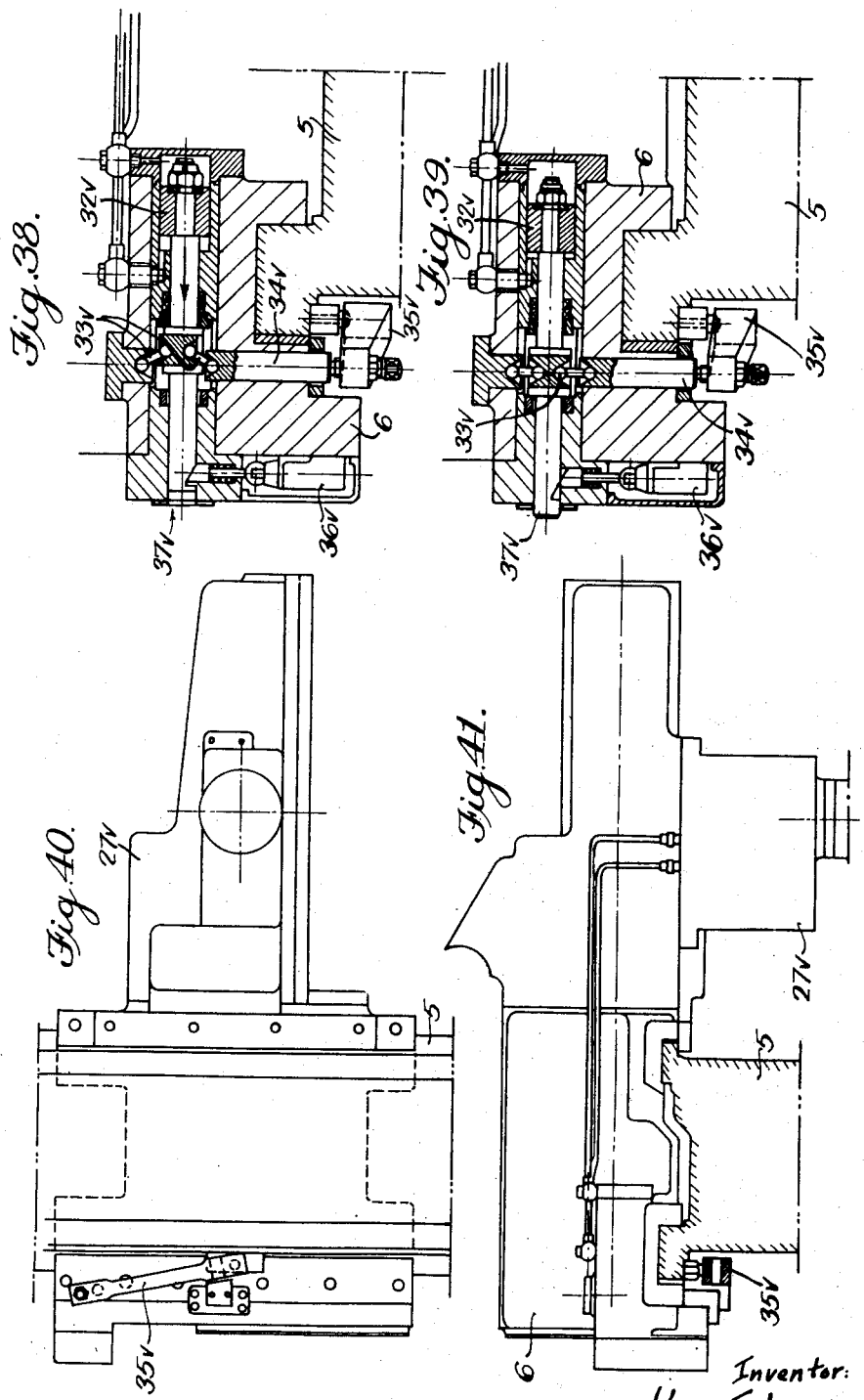

Patented Aug. 11, 1953

2,648,237

UNITED STATES PATENT OFFICE 2,648,237

UNIVERSAL REAMING MACHINE

Ugo Falconi, Milan, Italy, assignor to Officine Meccaniche Ceruti S. A., Milan, Italy, a firm Application March 21, 1951, Serial No. 216,813
In Italy October 12, 1950

6 Claims. (Cl. 77—3)

It is an object of the present invention to provide a boring machine adapted particularly for making a series of holes or bores at predetermined intervals without employing jigs or other particular production accessories and while keeping unaltered the performance of the machine as a universal boring machine.

In the accompanying drawings there is illustrated merely by way of example one embodiment of the invention as follows:

Fig. 1 is an overall side elevation of the boring machine;

Fig. 2 is a plan view of the boring machine;

Figs. 3, 4 and 5 show the mechanisms for displacing the vertical slide, in detail;

Fig. 6 shows the analogous mechanisms for the cross slide, in detail;

Fig. 7 is a partial section along the line A—A of Fig. 2;

Fig. 8 is a partial section of the same figure along the line B—B;

Fig. 9 is a section of Fig. 5 along the line C—C;

Fig. 10 is a section of Fig. 7 along the line L—L;

Fig. 11 is a section of Fig. 2 along the line D—D;

Figs. 12, 13 show two distinct positions of the coupling represented in Fig. 11;

Fig. 14 is a section of Fig. 1 along the line E—E;

Figs. 15, 16 are fragmentary sections showing two distinct positions of the coupling represented in Fig. 8a;

Figs. 17, 18 and 19 are diagrams illustrating the servo mechanism for the two fluted drums;

Figs. 20 and 21 are sections of the handwheel taken, respectively, in planes normal to each other;

Figs. 22 and 23 are fragmentary sections showing two different positions of the handwheel shown in Fig. 20;

Figs. 24 and 25 are two views in planes normal to each other, of the worm and wormwheel shown in Figs. 11 and 14;

Fig. 26 is a partial section of a development of the circumference of the parts shown in Figs. 24 and 25;

Fig. 27 is a partial section along the line F—F of Fig. 2;

Fig. 28 is a section along the line G—G of Fig. 27;

Fig. 29 is a section along the line H—H of Fig. 28;

Figs. 30, 31, 32 and 33 show the device for making the settings with respect to the reference planes and for registering the measures on the abutments that control the hydraulic servodrive for the stopping of slide movement, Fig. 30 showing this device in its entirety, Fig. 31 showing the comparator, the abutment or reference block, and the connections therebetween, Fig. 32 showing the comparator, the stopping block, and the connections therebetween, and Fig. 33, being a section transverse to the plane of Figs. 30, 31 and 32, and showing in detail a section of the means for holding the stopping block in place;

Fig. 34 illustrates the locking device of the cross slide;

Fig. 35 is a section along the line I—I of Fig. 34;

Fig. 36 represents a detail of the locking device of Fig. 34 in a different position;

Fig. 37 is a detail of the external indicator, showing the same in end elevation;

Fig. 38 illustrates an analogous device for the vertical slide;

Fig. 39 is the same in a different position;

Fig. 40 is a side view of the device;

Fig. 41 is a plan view thereof; and

Figs. 42 and 43 are diagrammatic views illustrating in side elevation and in plan, respectively, typical boring operations that may be effected on the workpiece.

Referring now to the drawings by numerals of reference, I designates the bed of the machine. The bed is provided with horizontal guides, on which there runs a carriage formed by a longitudinal slide 2 carrying at top the guides for a cross slide 3. On the latter there is placed the table 4 carrying the workpiece.

5 designates the standard. This is provided with vertical guides whereon there is slidable a slide (head) 6 carrying the chuck 7. This chuck 7 has rotary movement on a horizontal axis and axial movement parallel to the bed guides.

A gear box, not shown in the drawings, connects in a known manner kinematically the main drive motor B (Fig. 2) with the chuck to drive the same. Another gear box provides, in known manner, the movements of the various slides.

The boring machine is provided with the so-called "rest" or "stay" 9 (Fig. 1), the vertical slide 10 of which may be kinematically synchronized with the vertical movement of the head 6.

All the slides are provided with locking devices in order to lock them on their guides during operation. In the following description it will be assumed that the two slides that have a movement normal to the chuck axis (vertical slide and cross slide) are driven by way of a guide spindle and spindle nut.

The subscript v at the side of a reference numeral will indicate that the vertical slide 6 is referred to, and the subscript $t$ at the side of a reference numeral will indicate the cross slide 3 is referred to.

The screw $12v$ (Fig. 3) controlling the displacement of the vertical slide 6 as well as the screw $12t$ (Fig. 6) coordinated with the cross slide 3, can be connected kinematically to three mechanisms:

(I)—to the kinematical system $13v$ and $13t$ controlled by the feed gearing, as in conventional boring machines;

(II)—to an electric motor $14v$, $14t$, with a self-braking device (example: those used on cranes with an axially displaceable conical rotor). We shall call away-movement the sense of running of this motor if it determines a displacement of the slide that takes the group for precision setting away from the abutments 39/40 (Fig. 8) that will be discussed in the following, and approach the contrary movement;

(III)—to a hydraulic motor $15v$ or $15t$, installed in the precision setting group set on the slide itself, and which by means of an irreversible gearing $81v$—$82v$ or $81t$—$82t$ is connected to a bar $16v$—$16t$ parallel to the slide guides of the corresponding slide.

Each motor $15v$ or $15t$ has only one sense of rotation, which causes the "precision setting" of the slide and that takes place in the same sense as "approach."

The "away" and "approach" movements take place at the usual speeds of quick displacements in machine tools, while the precision setting movements are very slow;

Both the motor $14v$ or $14t$ and the bar $16v$ or $16t$ are kinematically connected each to one of the planetary bevel gears $17v$ or $17t$ of a differential gearing which has its planet carrying spider $18v$ or $18t$ kinematically connected with the guide screw $12v$ or $12t$ by means of a clutch $19v$ or $19t$.

The lever mechanism $20v$ or $20t$ permits engaging said clutch if clutch $21v$ or $21t$ coupling the member $12v$ or $12t$ with the kinematic system $13v$ or $13t$ of the feed gear, is not engaged and vice-versa.

The two clutches $19t$ and $21t$ (Fig. 6) of the cross slide are controlled by one single lever $20t$, which by means of the shaft 89 controls the clutch $21t$. On said shaft there is fitted a gear 90 which actuates a rack 91, which by means of a gear 92 actuates the shaft 93 controlling in turn the clutch $19t$, while for the vertical slide the clutches $19v$ and $21v$ (Figs. 3 and 4) are respectively controlled by the levers $20v$ and 22, connected by an interlocking device 23, which prevents either of the clutches from being engaged if the other one is not disengaged.

The interlocking device comprises a rod 83 (Figs. 4 and 5) slidable in a support 84 fixed to the framing of the boring machine, which at one end has teeth adapted to engage with a toothed sector 87 rigid with the axis of rotation of the lever $20v$ and at its other end is provided with a notch 85 wherein is adapted to engage a pin 86 rigid with a rack driven by a gear 88 provided on the rod of the lever 22.

In the position indicated in Fig. 4, the rod 83 prevents the pin 86 from rising, while a stop not visible in the drawing prevents it from descending. Therefore it is not possible to operate the lever 22 controlling the clutch $21v$. If the lever $20v$ is moved to the left disengaging $19v$, the notch of the rod 83 comes into registry with the pin 86 thus permitting operation of the lever 22 and, therefore, the engagement of the clutch $21v$ (see Fig. 3).

After engaging the latter, the rod 83 cannot slide any longer longitudinally and thus further operation of the clutch $19v$ is impossible.

The bar $16v$ ($16t$) (Figs. 3 and 6) is connected by means of the helical gear $24v$ ($24t$) to the wheel $25v$ ($25t$) in such a manner that small angles of rotation of the bar $16v$ ($16t$) correspond to large angles of rotation of the wheel $25v$ ($25t$). On the axis of the said wheel there is provided the dial $26v$ ($26t$) for reading precision settings, orientated in such a manner as to make it well visible for the operator.

$27t$ ($27v$) (Figs. 2 and 27, 28, 29) indicate small hydraulic plants fixed on the cross slide 3 and on the head 6, respectively, and comprising a motor pump group $94t$ (Fig. 27), and a group of three distributing valves 95, 96, 97 (Fig. 28), each controlled by an electromagnet 95', 96', 97', one of which is for precision setting (96, 96') and coordinated with the small hdraulic motor $15t$ (Fig. 6); the other two are coordinated with the locking devices $35t^1$, $35t^2$ and $35v$ respectively of the slides 3 and 6 (see Figs. 35 and 38).

In Figs. 27, 28, 29, which represent the small hydraulic plant, it is clearly visible how the distributors operate under the control of the corresponding electromagnets, for here 98, 99 and 100 designate the outlets for fluid under pressure, while 101 (Fig. 27) designates the conduit, which from the distributors returns into the pump chamber.

Parallel to the slide guides respectively of the vertical slide 6 and of the cross slide 3, there are provided two drums $38v$ and $38t$ (Figs. 1, 2), which are fluted axially and the cross section of which is indicated in Fig. 7, and which are supported rotatably but in fixed axial position on the bed of the machine.

On each groove of each fluted drum $38v$, $38t$ there is provided an abutment or reference block (to the left of Fig. 8) composed of two groups 41 and 42, which are connected by a micrometric screw 43 having right-handed and left-handed threads. To the right of Fig. 8 there is a stopping block consisting of two parts 39 and 40 adapted to be moved against each other and to be tightened in the groove by a clamping screw.

Each drum is provided (see Figs. 11 and 14) with a small hand-wheel $44v$ or $44t$ and is connected to the kinematic gearing that controls the rotation of the toothed wheel $45v$ or $45t$, which will be described in the following.

For the drum $38v$ (Fig. 14) the toothed wheel $45v$ is fitted on the hollow shaft $46v$ which carries the fixed part of a disconnectable dog clutch $47v$. The mobile part of said clutch is carried by the slidable tube $48v$, which is keyed on its inside to the drum $38v$ and on its outside to the hand-wheel $44v$.

Said tube $48v$ carries a pin $49v$ that can engage in a hole provided in the fixed flange $50v$. A small handwheel $51v$ provided with a threaded shank controls the axial displacement of the tube $48v$. Said tube can assume three positions;

(1). The position, in which the clutch $47v$ is engaged (see Fig. 14). The number of teeth of $47v$ is equal to the number of the drum divisions (drum $38v$) and, therefore, the number of relative positions between the drum $38v$ and the wheel $45v$, at which engagement can take place, is equal to the number of said divisions.

(2). The drum is loose (see Fig. 15).

(3). After disconnecting the clutch and engaging the pin in the flange 50v, the drum 38v remains fixed in a predetermined position, in which its zero division finds itself in correspondence with the levers of the group for precision setting (see Fig. 16).

For the drum 38t, the connecting device is quite similar to the one of the vertical drum (see Figs. 11, 12, 13) except for small differences due to the different arrangement of the member from which motion comes, as can be seen in the figures. The tube 46v is replaced by a shaft 46t, which passes through the whole drum 38t; the sleeve 48v is replaced by an inner clutch 48t$^1$ and into a threaded tube 48t$^2$; and the pin 49v is replaced by the spline 49t.

Contact of the vertical drum 38v against the thrust bearing 52v is obtained by gravity, while in the horizontal drum 38t it is obtained by the spring 53 against the thrust bearing 52t. The Figs. 11, 12 and 13 show clearly the three positions that the device is able to assume.

The kinematic gearing for operating the drum (see Fig. 17) is constituted as follows:

The hand-wheel 54 is kinematically connected with the same number of turns to the shaft 55 of the cams for controlling the electric contacts and to the gears (worms) 56v and 56t, which are engaged with the wheels (45v and 45t) of the drums 38v and 38t respectively.

A shaft 102 of the same kinematic gearing is rotated with the aid of a device 57 similar to the free-wheel devices of bicycles, and which permits rotation of the shaft 102 only in one direction.

The hand-wheel 54 is rigid with its shaft 103 by way of the flange 104 (Fig. 20), which is pinned onto said shaft 103, the shaft 103 being rotatable in the fixed part 59 (Fig. 20 and 22), by way of the ball bearing 105. The fixed part 59 has a ring 106 jutting into the inside of a corresponding annular recess provided in the hand-wheel 54.

Said ring-shaped projection 106 has a slit at top, in register with the vertical plane. The hand-wheel 54 carries at 90° from each other three radial push-rods 109, 109' and 109", each of which has, in the proximity of the centre of the hand-wheel, a notch 107 (Fig. 22), into which said ring-shaped projection 106 penetrates, if the push-rod is in pressed position.

Each of the push-rods is subjected to the action of a spring 108 which tends to push it radially outwardly. The push-rod 109 which finds itself in the position A under the action of its spring, is in the condition indicated in Fig. 23, viz. with its lower end 58 engaged in the recess of the ring-shaped projection 106. Hence the hand-wheel 54 cannot turn.

The other two push-rods 109' and 109" find themselves in positions B and C, displaced toward the centre of the hand-wheel, overcoming the corresponding springs 108, with the ring-shaped projection 106 engaged in the notches 107 of the push-rods. If now one presses the push-rod 109 until it is brought from the position indicated in Fig. 23 into the position of Fig. 22, the hand-wheel 54 is made free to turn in the sense indicated by the arrow until the subsequent push-rod 109', comes to the position A in registry with the recess of the ring-shaped projection 106. Then under the action of its spring 108 it is released upward to engage with its end 58 in the recess of the ring-shaped projection 106.

The hand-wheel 54 is locked again until on pressing the push-rod 109', now in position A, the operation previously described is repeated.

In Fig. 24 there is shown the toothing of one of the worm gears 45v and 45t, mounted on the axis of the drums 38v and 38t respectively. The number of teeth will be equal to the number of divisions of the drums, or to a multiple thereof. The teeth have a double alternated cutting: one section of a tooth side is parallel to the rotation axis of the gear and is followed by a helical section, and vice-versa. Each section parallel to the rotation axis, of one tooth, is opposite a helical section of the following tooth, in perimetral direction.

The worm 56v (56t) too, which is engaged with the aforesaid wheel, has two different pitches per turn of the circumference: a section of its peripheral development is represented in Fig. 26.

In a space slightly larger than the corresponding arc between the push-rods 109' and 109" (arc B—A—C in Fig. 20) of the hand-wheel 54, the thread has zero pitch and is engaged with the flanks of the teeth of the worm gear 45v (45t) having cylindrical profile, while in the remaining space (corresponding to the arc from C to B in Fig. 20), it has a pitch corresponding to the inclination of the helical toothing of the worm gear, in such a manner as to be able to engage with the latter.

The worm 56v (56t) has such a number of teeth and their pitch is selected in such a manner that in a complete turn of the worm, the drum 38v, 38t turns by one division, that is to say, the worm has one tooth if the number of teeth of the worm gear 45v (45t) is equal to the number of divisions of the drum 38v (38t), or such a number of teeth as corresponds to the number of teeth per one division, of the worm gear. The shaft 55 of the cams 60–63 for the electric contacts carries four contacts for each slide (for the sake of simplicity, only the contacts corresponding to one slide have been represented).

The mutual arrangement of the projections of the cams 60–63 on the shaft 55 is such that with one turn of this shaft in the sense of the arrow (Figs. 17–18), the cams 60, 61, 62 and 63 become effective successively in this order.

In the space of rotation of the shaft 55 corresponding to one rotation of the push-rod 109 of the hand-wheel 54 from position A to C, the cam 60 first controls the closing of the unlocking circuit, by acting upon the circuit of the electro-magnet 95' (Fig. 28) and thus on the distributor 95. Subsequently the cam 61 controls the "away" movement by operating upon the electric circuit of the motor 14v or 14t (Figs. 1 and 2).

However, in this circuit there is provided an auxiliary contact 36v (Fig. 38) or 36t (Fig. 34), which enables the closing of the said circuit to take place only after operation of the unlocking device illustrated in Figs. 34 and 38 and which will be explained hereinafter. In the space of rotation of the shaft 55 corresponding to one turn of the push-rod 109 of the hand-wheel 54 from position C to B, the inclined portions of the pitches of worms 56v and 56t come into operation and at the end of said space the cam 62 controls the circuit of the "approach" movement.

At last, in the space of rotation of the shaft 55, correspond: to one rotation of the push-rod 109 of the hand-wheel 54 from position B to A, the cam 63 controls the locking circuit which will be described hereinafter.

If the push-rod 109 of the hand-wheel 54 is in the position A, all the circuits are open and, therefore, they can be controlled by auxiliary contacts with push-buttons placed on the switchboards, which for the sake of simplicity are neither described nor illustrated here. The arrangement of the drums 38v and 38t is such as to permit, when the hand-wheel 54 is in one of the positions of rest (A, B, C), the levers of the corresponding group for precision setting, to come to the position represented in Figs. 7 and 8, with respect to one of the drum grooves, so as to be enabled to engage with the respective blocks 41—43.

The group for precision setting (see Figs. 9 and 10), which is applied to both the cross slide 3 and the vertical slide 6, comprises a hydraulic motor 15t (15v) (Figs. 3, 6 and 10) represented only diagrammatically, which receives its fluid under pressure from the motor pump group 94t (Fig. 28) by way of the distributor 96 actuated by the electromagnet 96' and from the distributor 110 (Fig. 10). This distributor 110 is controlled by the two-armed lever 111 articulated at 112 to a distributor casing 114 rigid with the slide. The other arm of this lever is engaged with a cross slot of the rod 113, supported in said casing to be longitudinally slidable. Upon the rod 113 there acts in an articulated manner a single-armed lever 115 fulcrumed to the casing 114, and the end of which cooperates with a lever 30 (Fig. 9) which too is articulated to said casing and the stroke of which is limited in one sense by the stop 116.

Both the lever 30 and the end 29 of the lever 115 project from the casing 114 as much as needed in order to be able to cooperate with the reference blocks 41—43 provided—as already described (see Figs. 7 and 8)—in the groove of the drum 38t (38v). On the back of the lever 30, towards the inside of the casing, there bears the knee-arm 117 of a two-armed lever articulated to the casing at 118, the other arm 119 of which cooperates with the plunger 120 of a distributor in opposition to a spring 121.

In the loose position of spring 121, said distributor puts the pressure fluid piping 99, coming from the small hydraulic plant 27t (Fig. 29), in communication with the chamber 122 (Fig. 10) of the hydraulic cylinder wherein the plunger 123 works. The plunger 123 undergoes the action of a spring arranged about the plunger stem in the chamber 124. If the spring 121 is compressed, the distributor puts the chamber 122 in communication with the discharge conduit for the pressure fluid 101.

The knee-lever-arm 117 cooperates with the stem 125 of the electric switches 126—128. The switch 126 is normally closed under the action of a spring (not shown in the drawing), while 127 and 128 normally are open. Switches 127 and 128 can be closed by action of the lever 117 upon the stem 125.

The pawl 31t (31v) (Fig. 8) controls the electric circuit of the motor 14t (14v) (see Figs. 1 and 2) for "away"-movement, by closing or opening the electric contact 129 (Fig. 9).

The system for locking each slide prior to the starting of boring work, is such that without manual operation, hydraulically, by means of a lever system, the slides are locked on their guides, namely by lever jaws 35, which exert upon the guides a pressure normal to the sliding direction (see Figs. 34 and 38).

A hydraulic plunger 32t (32v) (Figs. 34 and 38) transmits by means of two toggles 33t (33v) a thrust to one or two rods 34v, or 34t¹ and 34t², acting upon the lever 35v or upon the levers 35t¹ and 35t², respectively. These levers are fulcrumed upon the respective vertical slide 6 and cross slide 3, and exert heavy pressure normal to the direction of movement upon the longitudinal slide 2, or, respectively upon the upright 5. The two faces of the piston 32t (32v) are alternately acted upon, for locking and unlocking, by the fluid under pressure coming from the outlets 98 and 100 (Fig. 29) of the small hydraulic plant 27. Figures 34 and 36 show the device for the cross slide 3 in locking and unlocking position. Figs. 38 and 39 are respectively the positions of unlocking and locking for the vertical slide 6.

An electric contact 36t (36v) is provided in the circuit of the motor 14t (14v) and keeps this circuit open if locking is effected so as to prevent the motor 14t (14v) from starting before unlocking. An external indicator 37t (37v) makes the performed operation visible. Parallel to each drum 38v or 38t (see Figs. 1, 2 and 30 to 33) there is a rod 64v or 64t fixed to the standard 5 or longitudinal slide 2, and on which there slides a cursor 80v (80t) divided into two parts with micrometric adjustment 79 like the conventional cursors of gauges. The rod 64v (64t) carries a millimetre ruler 65 and a groove which permits applying small bars of calibrated length 66 (held in position by elastic pincers 67 on the vertical rod).

The cursor 80v (80t) carries a vernier 68 adjustable in its zero setting by the rings 69 in correspondence with the metric ruler. Cursor 80v (80t) also carries a device for transporting the setting, constituted by a comparator 70v (70t) upon which acts the lever 71, the rotation axis 72 of which can be turned about the axis 73 of the feeler of said comparator by means of the hand-wheel 74.

The nose 75 of the lever 71 can come in contact with the end surface of the setting blocks 41 on the drum (see Fig. 31), or with the terminal plane of the small calibrated rod 66 (see Fig. 32).

The rods 64v and 64t too carry each a small block 76v (76t) (Fig. 30) with micrometric screws 77 for adjusting the position of the small calibrated rods 66 to zero.

Operation is as follows:

The machine can be used as a normal boring machine, as well as with the mechanism for automatic setting. In order to use the boring machine as a normal machine, it is necessary to lock the two drums 38v and 38t in that position in which their zero division is in register with the levers of the group for precision setting (see Figs. 16 and 13). Then the slides cannot encounter any obstacles during their travel. The electric circuits for controlling the automatic displacements are also cut off; and the levers 20v and 20t are actuated in such a manner as to open the clutches 19v and 19t.

In those conditions, the performance of the machine is not distinct from the performance of a universal boring machine having locking automatically set e. g. by means of a servomechanism on the vertical and cross slides.

In order to operate the latter, the push buttons (not shown in the drawings) placed respectively on the head 6 and on the longitudinal slide 2 are operated.

The hand-wheel 54 is then in the position shown in Fig. 20, in which the push-rod 109 is in position A, and is so prepared for the possible application of the device for automatic setting.

In order to use the device for automatic setting, put the levers 20v and 20t in the positions, wherein the clutches 19v and 19t are engaged (Figs. 3 and 6).

Since the device for the vertical slide and the one for the cross slide are quite independent of each other, although they can be controlled by only one actuating member (hand-wheel 54), it is also possible to apply only one while the other one is disengaged (clutches 19v and 19t).

In order to describe the operation of the said setting device we may suppose that we may have to bore out the holes of the workpiece as indicated in Fig. 42.

The dimensions referred to are the two planes $x$ and $y$ of the said workpiece. The different holes will have to be numbered from 1 on. If there are no holes aligned with respect to the two axes, the maximum number of bores operable is equal to the number of the grooves of the drums 38v and 38t. The case of holes partly or entirely aligned will be treated afterwards.

The workpiece must be mounted on the table 4 and must be adjusted to contact the reference ruler 11 (Fig. 2). The horizontal plane of the table and the vertical plane of the ruler 11 constitute thus together the setting abutments of the machine, corresponding to the two reference planes of the workpiece.

For setting the working position, the machine offers two possibilities:

(1.) If the distances between the holes require only a moderate precision (for example one tenth of millimetre), the corresponding reading may be made on the metric ruler (on the vertical one for the dimensions indicated by $y$, and on the horizontal one for the dimensions indicated by $x$).

The drums 38v, 38t have to be released, by means of the handwheels 51v, 51t, (see Figs. 15 and 12) and each reading has to be made as used normally with gauges, that is to say, by locking in approximate position the upper part of the cursor 80v (80t) running on the bar 64v (64t) (Fig. 30), and registering by means of the micrometric adjustment screw 79 the position of the vernier 68 with respect to the ruler, with one tenth of millimetre accuracy.

The rings 69 of the vernier 68 serve only for adjusting to zero and should not be touched if performing those operations.

After reading, the hand-wheel 54 should be actuated for transporting the setting onto the end surface of the block 41 mounted in the groove of the drum carrying the same numeral by which the hole, that is to be drilled in the work, has been designated. For the setting of the blocks 41 and 42 (Fig. 8), the same technique should be followed, as with the cursor 80v (80t) sliding on the bar 64v (64t), that is to say, the lower block 42 is locked and with the micrometric screw 43 the upper part 41 is adjusted until the pointer of the comparator 70v (70t) is in the zero position. Then all the screws of the block are locked.

When all setting blocks on the drum are locked in correct position, the stopping blocks 39, 40 (Fig. 8) should be set. This setting does not require any particular accuracy as one needs only to limit the passive time of the dead strokes between one setting and the other. At any rate, passive time is short considering the speed of displacement.

A gauge determining the minimum distance between the stopping block 39/40 and the two setting blocks 41 and 42 (for different successive grooves) facilitates operation.

(2.) For high precision setting, instead of referring to the metric ruler, one uses the small calibrated rods 66 (Fig. 30) supplied as an accessory together with the machine. In this case, the lever 71 transmits directly the measure of the calibrated small rods onto the end surface of the blocks 41. All the rest of the settings are effected as in paragraph 1.

The operation mentioned above should be preceded by adjusting to zero the measuring instruments with respect to the reference planes of the machine; and this ought to be done the first time the machine is used, and should be repeated if maintenance service of said machine is effected.

This has to be done for both the use of metric rulers and the use of the calibrated rods, and it consists in providing a hole in a specimen work piece following the procedure hereinbefore described, and in checking them whether there is correspondence or not between the actual dimensions obtained and the indications of the verniers on the metric rulers or the lengths of the small calibrated rods.

Each vernier is displaced by the difference found, using the rings 69, or the small calibrated rod by means of the micrometric screw 77 (Fig. 30), then a new control bore is made.

For the performance of work, the hand-wheel 54 should be in that position, in which the push-rod 109 (Fig. 20) is in position A and which corresponds to both the working position and the rest position of the machine. The other two positions of the handwheel 54 serve only as passage between one boring and the subsequent one.

The two slides are unlocked by using the already mentioned auxiliary push-buttons on the head 6 or on the longitudinal slide 2 (not shown in the drawing) and the slides are displaced by means of the "approach" push-buttons and "away"-movement push-buttons (which too are not shown in the drawing), so that the levers of the groups for precision setting are some centimetres away from the end surfaces of the blocks 41 and 42 of the first grooves of the two drums 38v and 38t.

In these conditions, the drums are engaged by means of the hand-wheels 51v and 51t (Figs. 11, 14), making the first grooves of the drums correspond to said levers of the groups for precision setting. Subsequently, the two "approach" push-buttons are pressed.

In the "approach" movement, the lever 30t (Fig. 9) or 30v encounters the setting block 41 (Fig. 8) and is lifted, thus causing the lifting of the lever 117 and therefore the displacement of the rod 125. By this rod 125, the contacts 127 and 128 are closed and so is the circuit of the motor pump 94t (Fig. 28) or 94a of the small hydraulic plant for precision setting and that of the electromagnet 96'.

Since the feed pipe 99 (Fig. 29) of the small hydraulic plant is in communication with the chamber 122 (Fig. 10) of the cylinder, in which works the plunger 123, this plunger overcomes, under the action of the compressed fluid, the pressure of the spring acting thereupon, and presses upon the lever 111. This shifts the distributor 110 so as to send fluid under pressure into the small hydraulic motor 15t or 15v (Figs. 3, 6, 10). While the slide goes on with its "approach" movement further, first the motion for precision setting is engaged; then the "approach" motion is interrupted by means of a device known per se, which operates with extreme accuracy.

Said device has the advantage of allowing for a very high precision, because the stopping of the slide takes place by action of the abutment 41—43 (Fig. 8) upon the lever 29t (29v) (Fig. 9) if the latter is liberated from the pressure of the plunger 123, because in the meantime by action of the lever 119 upon the plunger 120, the feed of compressed fluid through the pipe 99 is stopped and the chamber 122 of the plunger 123 has been put in communication with the return conduit 101 not under pressure. In the stage of precision setting, the slide movement is very slow and can be hardly perceived. The operator checks the end of the movement by observing the corresponding pointer 26v (26t) for precision setting (Figs. 3 and 6).

When these pointers have stopped, the operator presses the two locking push-buttons and the machine is ready for making the first hole. In order to make the subsequent hole, the operator presses down the push-rod 109 of the hand-wheel 54 (Fig. 20), which is in position A and turns the hand-wheel until the push-rod 109 stops in the position C. Immediately after starting the rotation of the hand-wheel 54, the slide un-locking mechanism intervenes. As soon as the push-rod 109 of the handwheel is in position C and the unlocking of the slide has been carried out, the latter is taken away automatically until the corresponding block on the drum makes it stop. If both slides are at a standstill, the operator turns the hand-wheel 54 in such a manner that the push-rod 109 comes from position C to position B (Fig. 20), wherewith in a first stage the rotation of the drums and subsequently the movement of "approach" are effected. The operator checks, as described, before the stoppage of the slides by observing the pointers for precision setting 26v (26t) (Figs. 3 and 6). Then the operator rotates the hand-wheel 54 so that the push-rod 109 goes from position B to position A, with which the slides are locked, and the machine is put again in the working position.

After finishing all bores in one piece, for the working of a subsequent analogous piece the operator takes the two drums back to their starting positions and sets the two slides following the technique hereinbefore described, to make the machine ready for the making of the new first hole.

In making holes all aligned on a horizontal or vertical straight line it suffices to engage the automatic displacement devices in the respective slides and then to set the blocks only on the corresponding drums. As in the case of non-aligned holes, the maximum number of possible borings, without requiring any work of taking up again, is equal to the number of useful grooves of the drums.

If the holes are aligned even only partially, as for example in Fig. 43, one may proceed as follows: one places onto the vertical drum 38v four abutments corresponding respectively to the lines $a$, $b$, $c$, $d$ of Fig. 43 and onto the horizontal drum five abutments corresponding to the lines 1, 2, 3, 4, 5; one releases the vertical drum 38v (see Fig. 15) and lets in the horizontal drum 38t (see Fig. 11); then one performs the first hole $a^1$ (Fig. 43) and passes to the subsequent operations, with which the machine will automatically set in the positions corresponding to the holes $a^2$, $a^3$; one takes then the vertical drum 38v to a position corresponding to line $b$ (Fig. 43) and the horizontal drum 38t to a position corresponding to line 2, whereby the setting $b^2$ is determined, to which correspond the subsequent ones $b^3$, $b^4$, $b^5$ and so on for the lines $c$ and $d$.

With this method it is possible to make up to 225 holes with drums having 15 useful grooves.

Having thus described my invention, what I claim is:

1. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at slow speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, handwheels for rotating said drums, shiftable clutches for coupling said handwheels to said drums to permit rotation of said drums, cams for controlling the circuits to said electric motors, and means for synchronizing the operations of the various parts.

2. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at slow speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, a plurality of valves for controlling the hydraulic motors and the electric motors, means connecting the levers with said valves, so as to first actuate the hydraulic motor associated with a slide and to then stop the electric motor associated with that slide, a pawl carried by each slide for disconnecting the electric motor associated with each slide on withdrawal movement of said slide, handwheels for rotating said drums, shiftable clutches for coupling said handwheels to said drums to permit rotation of said drums, cams for controlling the circuits to said electric motors, and means for synchronizing the operations of the various parts.

3. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at slow speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, a hollow shaft coordinated with each drum, a pair of one-way clutches, one part of each of which is secured to each hollow shaft, a gear secured to each hollow shaft, a pair of handwheels, means operatively connecting each gear with one handwheel, a slidable tube associated with each drum and carrying the other part of the associated one-way clutch, each tube being connected to one drum and to one handwheel, and a handwheel having threaded engagement with each tube and carrying a pin adapted to engage in a hole in a relatively fixed part of the machine, thereby to lock the associated drum against rotation.

4. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at slow speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, a handwheel for rotating said drums, shiftable clutches for coupling said handwheel to said drums to permit rotation of said drums, means for clamping said slides to the machine, cams for controlling the circuits of said electric motors and locking and unlocking circuits to said slide clamping means, a pair of shafts in said machine, means for connecting the handwheel to one of said shafts comprising a free-wheeling device, a plurality of radially-disposed spring-actuated rods on the handwheel, and a pair of relatively fixed ring-shaped projections on said machine adapted to engage the rods of the handwheel.

5. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at low speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, handwheels for rotating said drums, shiftable clutches for coupling said handwheels to said drums to permit rotation of said drums, cams for controlling the circuits of said electric motors, a hollow shaft coordinated with each drum, a wormwheel connected to each hollow shaft, and means connecting each said gear with one handwheel comprising a worm having teeth shaped to effect rotation of the associated handwheel during that fraction of a turn during which the associated cam does not effect change in the associated electrical circuit.

6. A universal boring machine comprising a vertical slide and a cross slide, a rotary screw for actuating each of said slides, feed gearing for driving each screw, a gear differential for also driving each screw, a shiftable clutch for connecting and disconnecting the feed gearing to each screw, a shiftable clutch for connecting and disconnecting the differential with each screw, an electric motor for driving each differential at high speed to effect rapid traverse of each slide in either direction, a hydraulic motor for driving the screw connected to each slide at slow speed in one direction, means for preventing engagement of either feed gearing clutch while the differential clutch for the same screw is engaged and vice versa, a rotary drum coordinated with each slide and having a plurality of axially-extending grooves which are parallel to the direction of movement of the associated slide, setting blocks and stopping blocks mountable in the grooves of each drum and adjustable along said grooves, a lever connected to each slide and adapted to engage said blocks, and means for indicating the positions of the blocks comprising a dial gauge associated with each drum and having a plunger-type feeler, and a lever rotatable on the axis of said feeler and adapted to contact at one end with the setting blocks of the associated drum and at its opposite end with the associated feeler.

UGO FALCONI.

References Cited in the file of this patent

UNITED STATES PATENTS

| Number | Name | Date |
|---|---|---|
| 2,158,649 | Armitage | May 16, 1939 |
| 2,315,877 | Snyder | Apr. 6, 1943 |
| 2,483,712 | Schafer | Oct. 4, 1949 |